United States Patent
Vallo et al.

(10) Patent No.: US 11,415,252 B2
(45) Date of Patent: Aug. 16, 2022

(54) SWIVEL COUPLING

(71) Applicant: Fiskars Finland Oy Ab, Helsinki (FI)

(72) Inventors: Nicholas Joseph Vallo, Madison, WI (US); Jean Mauricio Uruena Montoya, Madison, WI (US)

(73) Assignee: LAWN & GARDEN, LLC, New York, NY (US)

(*) Notice: Subject to any disclaimer, the term of this patent is extended or adjusted under 35 U.S.C. 154(b) by 0 days.

(21) Appl. No.: 16/956,242

(22) PCT Filed: Dec. 21, 2018

(86) PCT No.: PCT/IB2018/060543
§ 371 (c)(1),
(2) Date: Jun. 19, 2020

(87) PCT Pub. No.: WO2019/130202
PCT Pub. Date: Jul. 4, 2019

(65) Prior Publication Data
US 2021/0148496 A1  May 20, 2021

Related U.S. Application Data

(60) Provisional application No. 62/611,241, filed on Dec. 28, 2017.

(51) Int. Cl.
*F16L 27/08*       (2006.01)
*F16L 15/00*       (2006.01)
(Continued)

(52) U.S. Cl.
CPC ........... *F16L 27/082* (2013.01); *F16L 15/001* (2013.01); *F16L 19/02* (2013.01); *F16L 27/0804* (2013.01); *B05B 15/63* (2018.02)

(58) Field of Classification Search
CPC ......... B05B 9/01; B05B 15/652; B05B 15/68; B05B 15/63; B05B 15/65; F16L 27/082; F16L 27/0804; F16L 27/08
See application file for complete search history.

(56) References Cited

U.S. PATENT DOCUMENTS 1,698,195 A * 1/1929 Karbowski ............. F16L 33/24
285/251
2,333,349 A * 11/1943 Weatherhead, Jr. .... F16L 33/24
29/506

(Continued)

OTHER PUBLICATIONS

International Search Report and Written Opinion for International Application No. PCT/IB2018/060543, dated Apr. 29, 2019, 9 pages.

(Continued)

*Primary Examiner* — David Bochna
(74) *Attorney, Agent, or Firm* — Foley & Lardner LLP

(57) ABSTRACT

A watering nozzle including a handle configured to be grasped by a user, an inlet connector including a flange rigidly coupled to the handle, and an inlet engagement feature, a swivel coupling including a garden hose thread and a swivel shoulder adjacent a swivel opening arranged concentrically about a central axis, the swivel coupling rotatable relative to the handle about the central axis, and an insert shank including a swivel seal in sealed contact with the swivel coupling, a first shank shoulder in contact with the swivel shoulder, and a shank engagement feature in rigid engagement with the inlet engagement feature.

18 Claims, 6 Drawing Sheets

(51) Int. Cl.
*F16L 19/02* (2006.01)
*B05B 15/63* (2018.01)

(56) References Cited

U.S. PATENT DOCUMENTS

| | | | | |
|---|---|---|---|---|
| 2,367,447 A | * | 1/1945 | Strout | F16L 33/24 |
| | | | | 285/247 |
| 2,587,170 A | * | 2/1952 | Klingler | F16L 27/082 |
| | | | | 285/279 |
| 2,829,671 A | * | 4/1958 | Ernst | F16L 33/24 |
| | | | | 285/245 |
| 3,218,025 A | * | 11/1965 | Abelson | F16L 29/02 |
| | | | | 251/149.5 |
| 3,964,772 A | * | 6/1976 | Cox, Jr. | F16L 33/01 |
| | | | | 285/39 |
| 4,389,017 A | | 6/1983 | Geberth, Jr. | |
| 4,641,859 A | * | 2/1987 | Walters | F16L 37/0848 |
| | | | | 285/27 |
| 5,979,800 A | * | 11/1999 | Takagi | B05B 1/1681 |
| | | | | 239/440 |
| 6,050,508 A | * | 4/2000 | Fan | B05B 15/652 |
| | | | | 239/587.1 |
| 6,227,579 B1 | | 5/2001 | Humphreys | |
| 6,604,758 B1 | * | 8/2003 | Assenheimer | F16L 33/2076 |
| | | | | 285/114 |
| 9,108,210 B1 | * | 8/2015 | Goodson | B05B 9/01 |
| 2004/0041395 A1 | | 3/2004 | Frost | |
| 2005/0274831 A1 | * | 12/2005 | Burdick | F16L 27/082 |
| | | | | 239/569 |
| 2006/0022069 A1 | | 2/2006 | Burnworth et al. | |
| 2009/0051159 A1 | * | 2/2009 | Cameron | F16L 41/14 |
| | | | | 285/5 |
| 2011/0204101 A1 | | 8/2011 | Jenkins | |
| 2013/0140382 A1 | * | 6/2013 | Eley | B05B 15/652 |
| | | | | 239/526 |
| 2015/0048615 A1 | | 2/2015 | Mammen et al. | |
| 2015/0219259 A1 | | 8/2015 | Weems et al. | |
| 2017/0146168 A1 | | 5/2017 | Caprio et al. | |
| 2017/0350543 A1 | * | 12/2017 | Lillmars | F16L 27/047 |
| 2020/0347975 A1 | * | 11/2020 | Chen | B05B 15/65 |
| 2021/0199218 A1 | * | 7/2021 | Lin | F16L 27/0804 |

OTHER PUBLICATIONS

Office Action Received for Canadian Application No. 3087128, dated Aug. 16, 2021, 4 pages.

* cited by examiner

SWIVEL COUPLING

CROSS-REFERENCE TO RELATED APPLICATION

This application claims the benefit of priority to international patent application number PCT/IB2018/060543, having a filing date of Dec. 21, 2018, which claims the benefit of and priority to U.S. Provisional Application No. 62/611,241, filed Dec. 28, 2017, the complete disclosures of which are hereby incorporated by reference for all purposes content of which is hereby incorporated by reference in its entirety.

BACKGROUND

The present invention relates generally to threaded couplings. More particularly, the present invention relates to swivel couplings for a garden hose.

SUMMARY

One embodiment relates to an attachment mechanism for a hose attachment. The swivel coupling includes a swivel coupling and an insert shank. The swivel coupling includes a garden hose thread, a hose seal seat, a swivel seal surface, and a swivel shoulder adjacent a swivel opening arranged concentrically about a central axis. The insert shank includes a swivel recess retaining a swivel seal in sealed contact with the swivel seal surface, a first shank shoulder in contact with the swivel shoulder, and a shank engagement feature configured to rigidly couple to the hose attachment.

Another embodiment relates to a watering nozzle that includes a handle configured to be grasped by a user, an inlet connector including a flange rigidly coupled to the handle, and an inlet engagement feature. A swivel coupling includes a garden hose thread and a swivel shoulder adjacent a swivel opening arranged concentrically about a central axis, the swivel coupling rotatable relative to the handle about the central axis. An insert shank includes a swivel seal in sealed contact with the swivel coupling, a first shank shoulder in contact with the swivel shoulder, and a shank engagement feature in rigid engagement with the inlet engagement feature.

Another embodiment relates to a method including rigidly coupling an inlet connector flange of an inlet connector to a handle of a hose attachment, aligning a swivel opening of a swivel coupling with an inlet cavity of the inlet connector, inserting a shank engagement feature of an insert shank through the swivel opening, and engaging the shank engagement feature with an inlet engagement feature of the inlet connector so that a first shank shoulder of the insert shank abuts a swivel shoulder of the swivel coupling.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring generally to the drawings, an attachment mechanism for connecting a watering nozzle to a garden hose is shown and described that enables rotation of the watering nozzle without rotation of the hose. The attachment mechanism includes an inlet connector rigidly coupled or adhered to the watering nozzle, a swivel coupling with threads sized to threadingly engage the garden hose, and an insert shank that sealingly couples the swivel coupling to the inlet connector while allowing rotation therebetween. The insert shank does not touch or contact the garden hose and is concentric with the swivel coupling. Independent rotation of the watering nozzle relative to the garden hose inhibits the hose from twisting while water flows and the watering nozzle is moved laterally. The static or not twisting garden hose reduces a user effort when aiming or redirecting the watering nozzle during use. The attachment mechanism decreases discomfort in the user's wrist and improves ease of use during use of the watering nozzle.

Previous attempts to provide rotation between a nozzle and a garden hose involved quick connect disconnect fittings and required the user to buy additional products (e.g., a quick connect system) to connect the garden hose to the nozzle. The attachment mechanism disclosed herein built into the watering nozzle and connects to standard garden hose threads, so users with multiple hoses do not need multiple quick connect systems or products.

Figure 1:
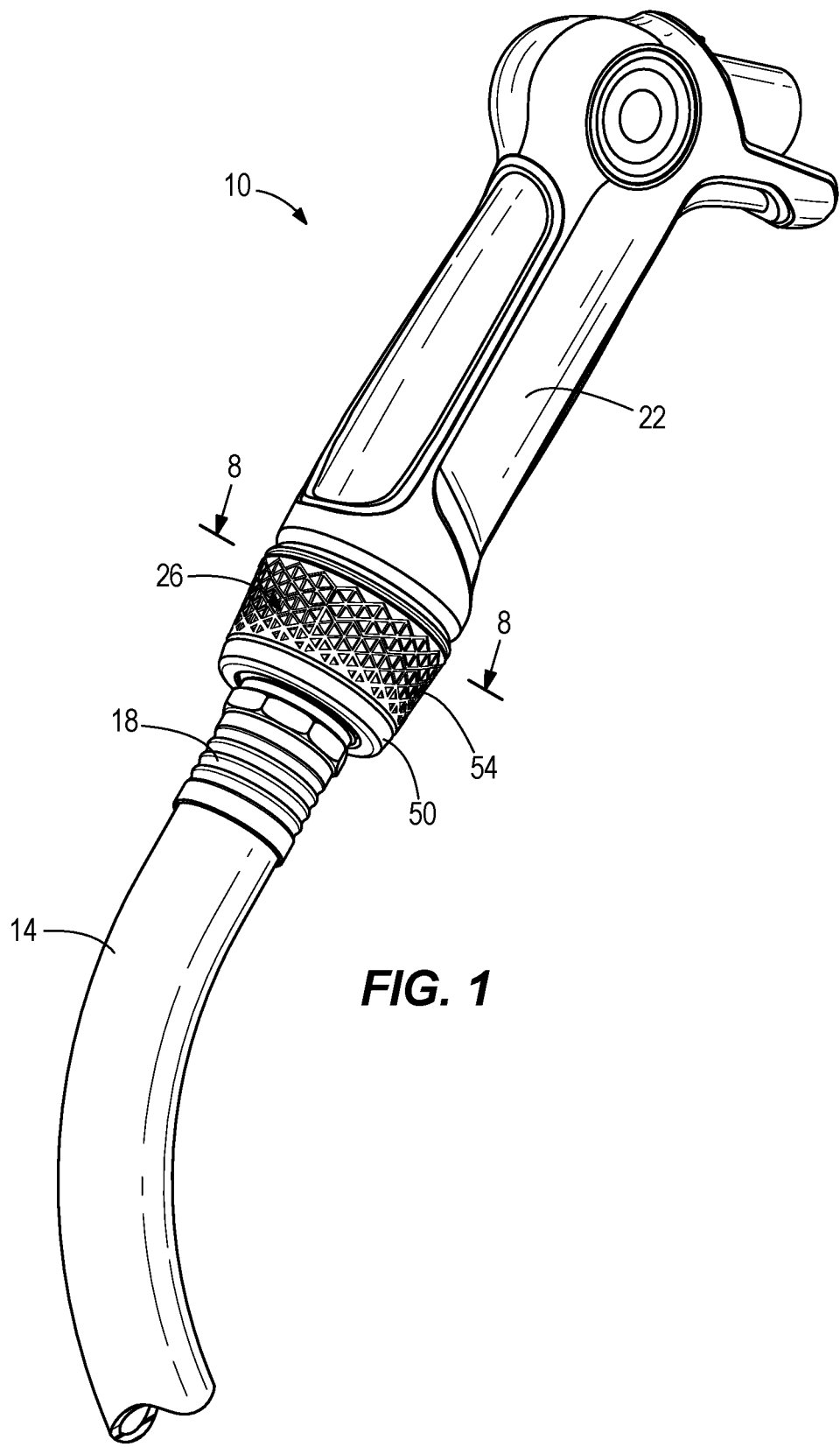
FIG. 1 is a perspective view of a watering nozzle coupled to a garden hose, according to an exemplary embodiment.

As shown in FIG. 1, a hose attachment in the form of a watering nozzle 10 is structured to selectively connect to a hose in the form of a garden hose 14 that includes a garden hose thread connector 18. The watering nozzle 10 is structured to accept a flow of water from the garden hose 14 and to provide a stream of water that a user can direct. In some embodiments, the hose attachment is another form of tool or attachment such as a sprinkler, a pressure washer, a second hose, a children's water toy, or another attachment, as desired.

The watering nozzle 10 includes a body in the form of a handle 22 that a nozzle system (not shown), trigger (not shown), or other control components (not shown) may be attached to. A swivel coupling 26 is coupled to the handle 22 for rotation relative thereto and is structured to threadingly engage the garden hose thread connector 18. The swivel coupling 26 provides a sealed connection between the handle 22 and the garden hose 14 while allowing the handle 22 to rotate relative to the garden hose 14 while in use.

Figure 2:
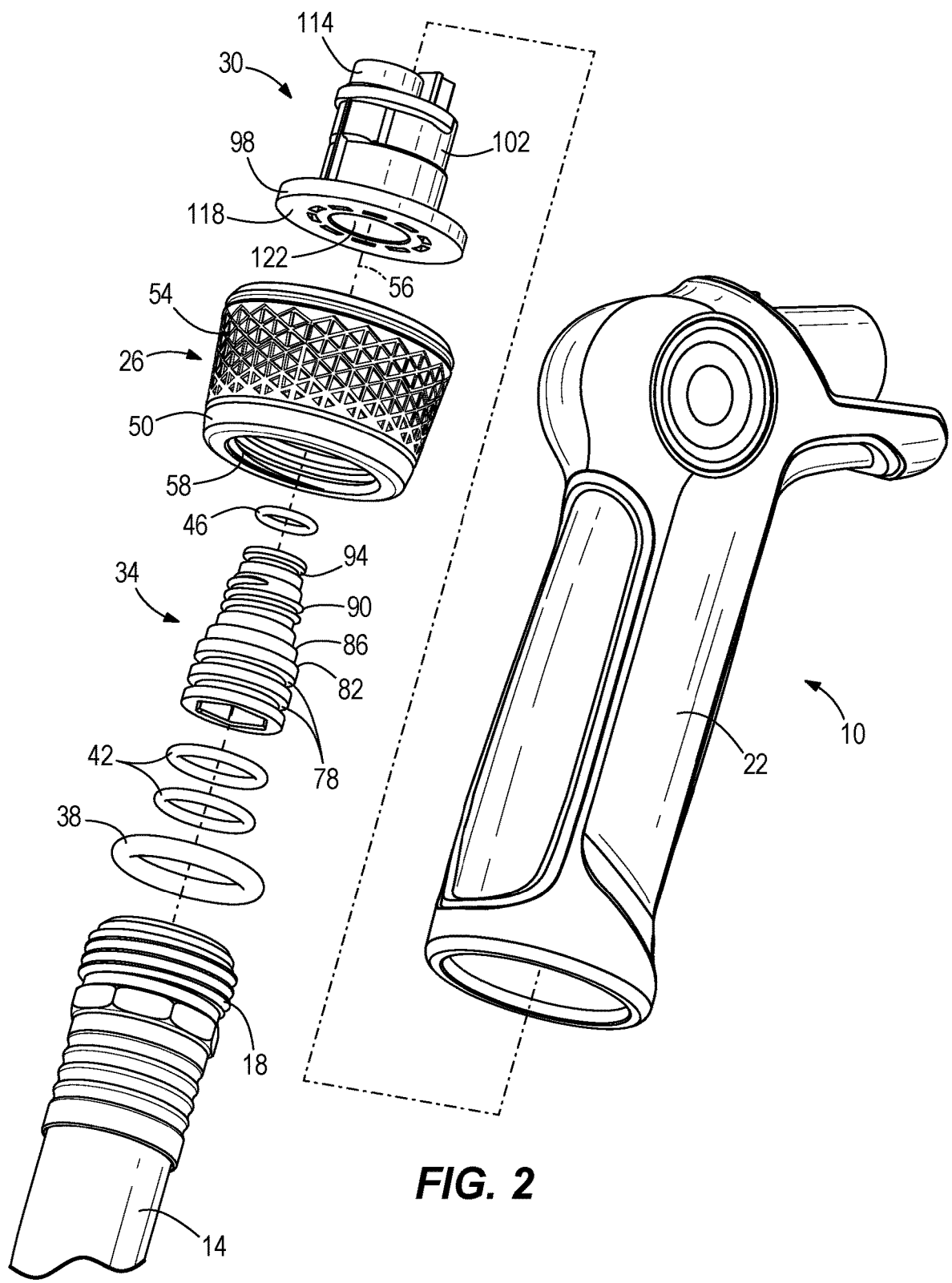
FIG. 2 is an exploded perspective view of the watering nozzle and garden hose of FIG. 1.

As shown in FIG. 2, an inlet connector 30 is received in and rigidly coupled to the handle 22, and an insert shank 34 couples the swivel coupling 26 to the inlet connector 30. A hose seal or o-ring 38 is positioned between the swivel coupling 26 and the garden hose thread connector 18 to provide a seal therebetween. A swivel seal in the form of two swivel o-rings 42 are positioned between the swiveling coupling 26 and the insert shank 34 to provide a seal therebetween. An inlet seal in the form of an inlet o-ring 46 is positioned between the insert shank 34 and the inlet connector 30 to provide a seal therebetween. In some embodiments, the seals may include, gaskets, lip seals, tortured path seals, another seal type, or a combination of seals, as desired.

Figure 3:
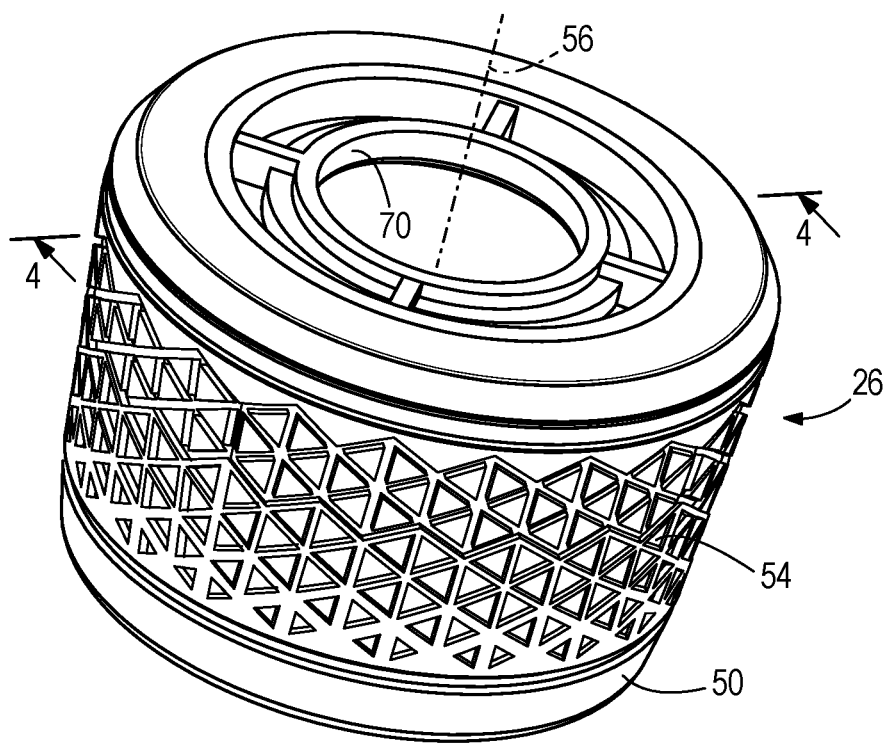
FIG. 3 is a perspective view of a swivel coupling of the watering nozzle of FIG. 1, according to an exemplary embodiment.
Figure 4:
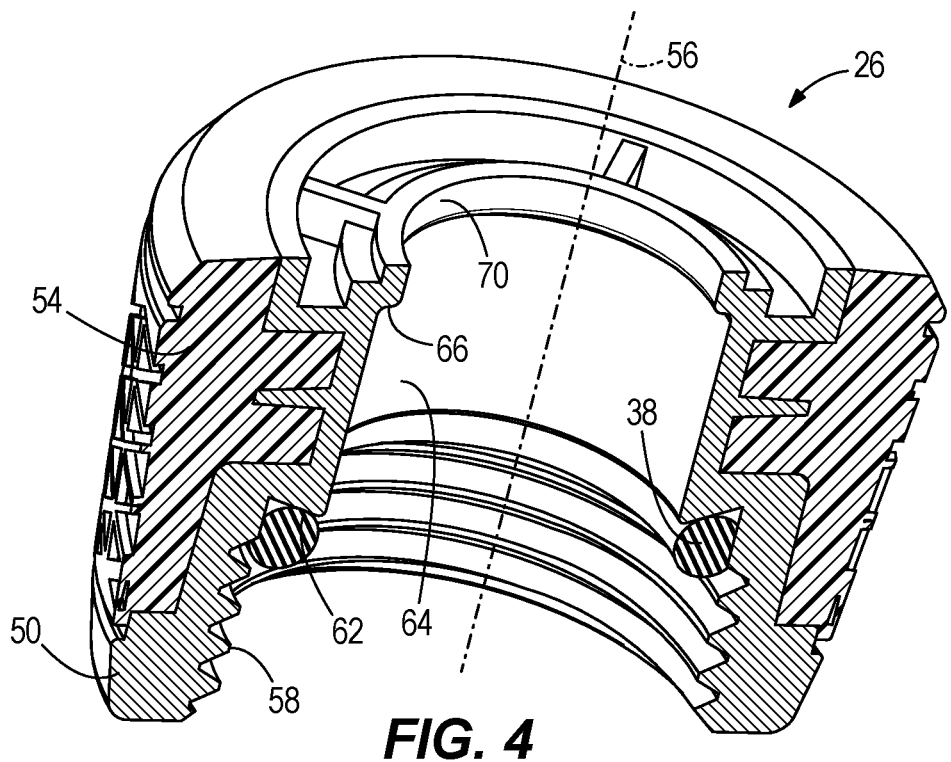
FIG. 4 is a section view of the swivel coupling taken along line 4-4 of FIG. 3.

As shown in FIGS. 3 and 4, the swivel coupling 26 includes a rigid swivel body 50 and a textured grip 54. In some embodiments, the rigid swivel body 50 is formed from zinc coated or chromed aluminum. In some embodiments, the textured grip 54 is formed from rubber. In some embodiments, the rigid swivel body 50 and the textured grip 54 are formed from plastics, for example in an overmolding. The rigid swivel body 50 defines a central axis 56, swivel threads 58 sized to engage the garden hose thread connector 18, a hose seat 62 sized to receive the hose o-ring 38, a swivel seal surface 64 that defines a constant diameter along the central axis 56, and a swivel shoulder 66 sized to receive the insert shank 34 and positioned adjacent a swivel opening 70. In some embodiments, the hose seat 62 defines an acute angle that biases the hose o-ring 38 radially away from the central axis 56 when the hose o-ring 38 is under compression. In some embodiments, the swivel shoulder 66 defines a rounded edge. In some embodiments, the swivel shoulder 66 defines a sharp ninety degree edge. The swivel opening 70 is concentric about the central axis 56.

Figures 5, 6:
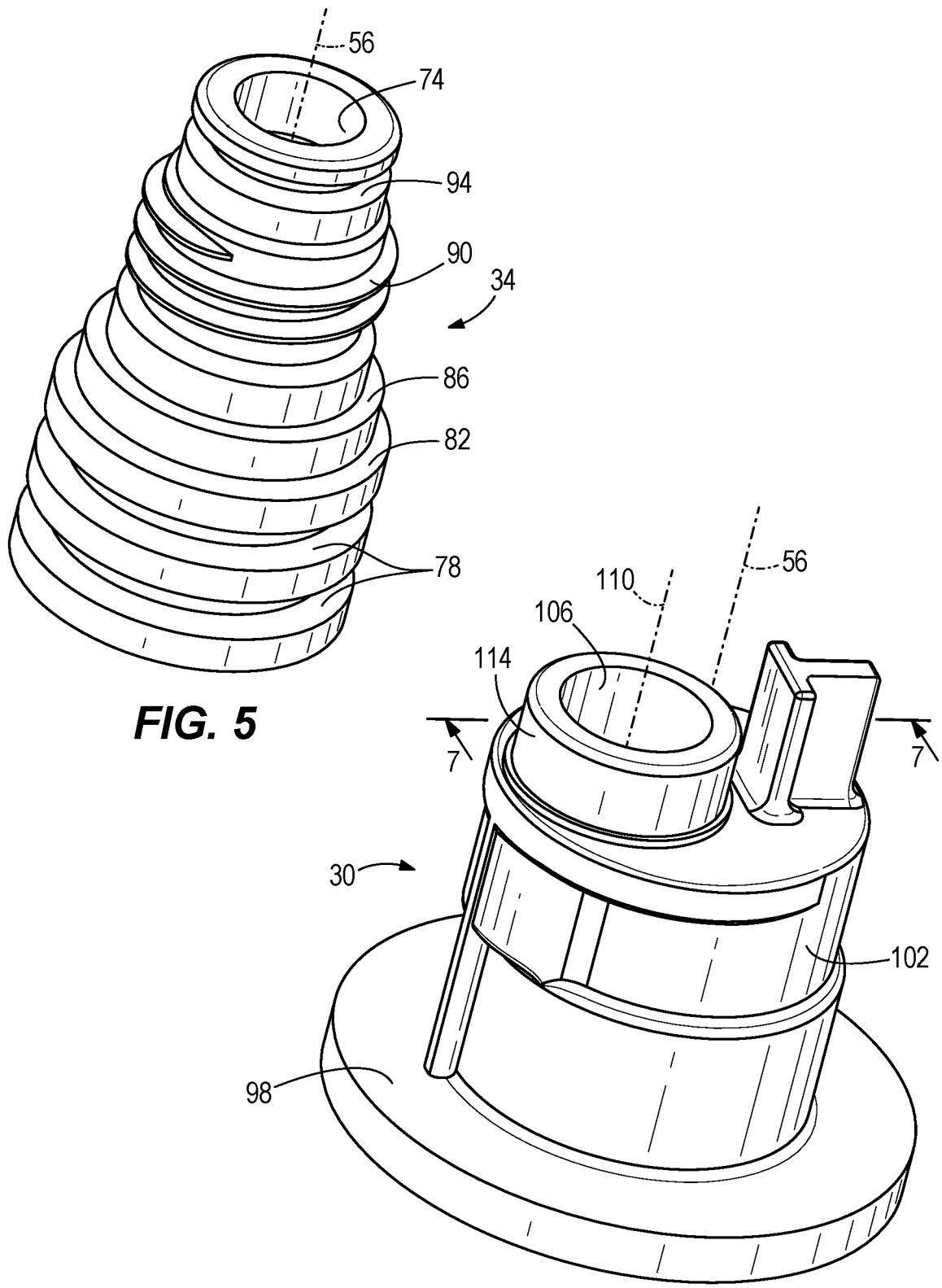
FIG. 5 is a perspective view of an insert shank of the watering nozzle of FIG. 1, according to an exemplary embodiment.
FIG. 6 is a perspective view of an inlet connector of the watering nozzle of FIG. 1, according to an exemplary embodiment.

As shown in FIG. 5, the insert shank 34 defines a shank fluid flow passage 74 extending along the central axis 56, two swivel recesses 78 sized to receive the swivel o-rings 42, a first shank shoulder 82 sized to engage the swivel shoulder 66, a second shank shoulder 86 spaced from the first shank shoulder 82 along the central axis 56 and sized to engage the inlet connector 30, a shank engagement feature in the form of shank threads 90 that engage the inlet connector 30, and an inlet recess 94 sized to receive the inlet o-ring 46.

As shown in FIG. 6, the inlet connector 30 defines a flange 98 that extends from a body portion 102, an inlet opening 106 extending along an inlet axis 110, and an engagement surface 114 sized to engage the handle 22 and provide fluid flow thereto. The inlet axis 110 is offset from the central axis 56. The flange 98 is structured to be fused with, adhered to, or otherwise rigidly bonded to the handle 22 in a sealed arrangement. In some embodiments, fasteners may be used to couple the flange 98 to the handle 22. In some embodiments, the flange 98 may not be sealed water tight relative to the handle 22. In some embodiments, the engagement surface 114 is sealingly mated with an interior tube or passageway of the handle 22 to provide fluid flow therebetween. In some embodiments, the inlet connector 30 is formed as a part or portion of the handle 22.

Figure 7:
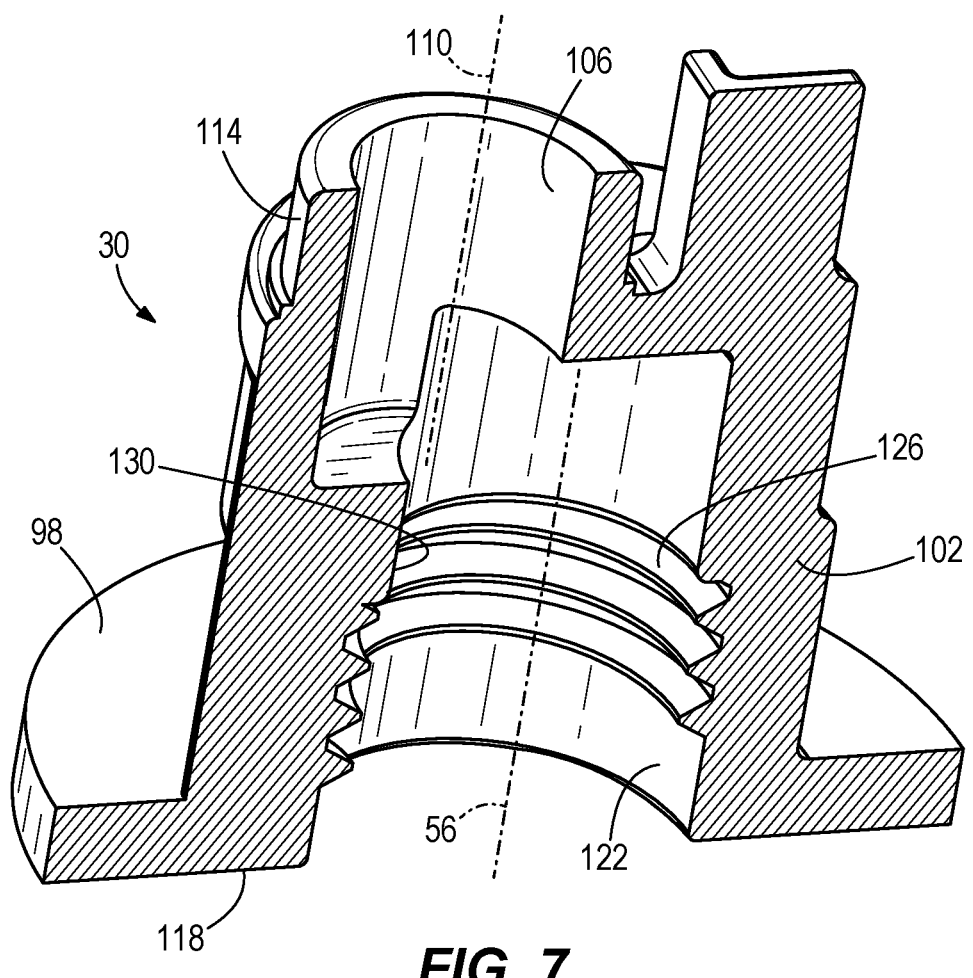
FIG. 7 is a section view of the inlet connector taken along line 7-7 of FIG. 6.

As shown in FIG. 7, the flange 98 defines a lower surface 118 arranged to mate with the second shank shoulder 86, and an inlet cavity 122 concentric with the central axis 56 and including an inlet engagement feature in the form of inlet threads 126 sized to threadingly engage the shank threads 90. The inlet cavity 122 also defines an inlet seal surface 130 that defines a constant diameter along the central axis 56.

Figure 8:
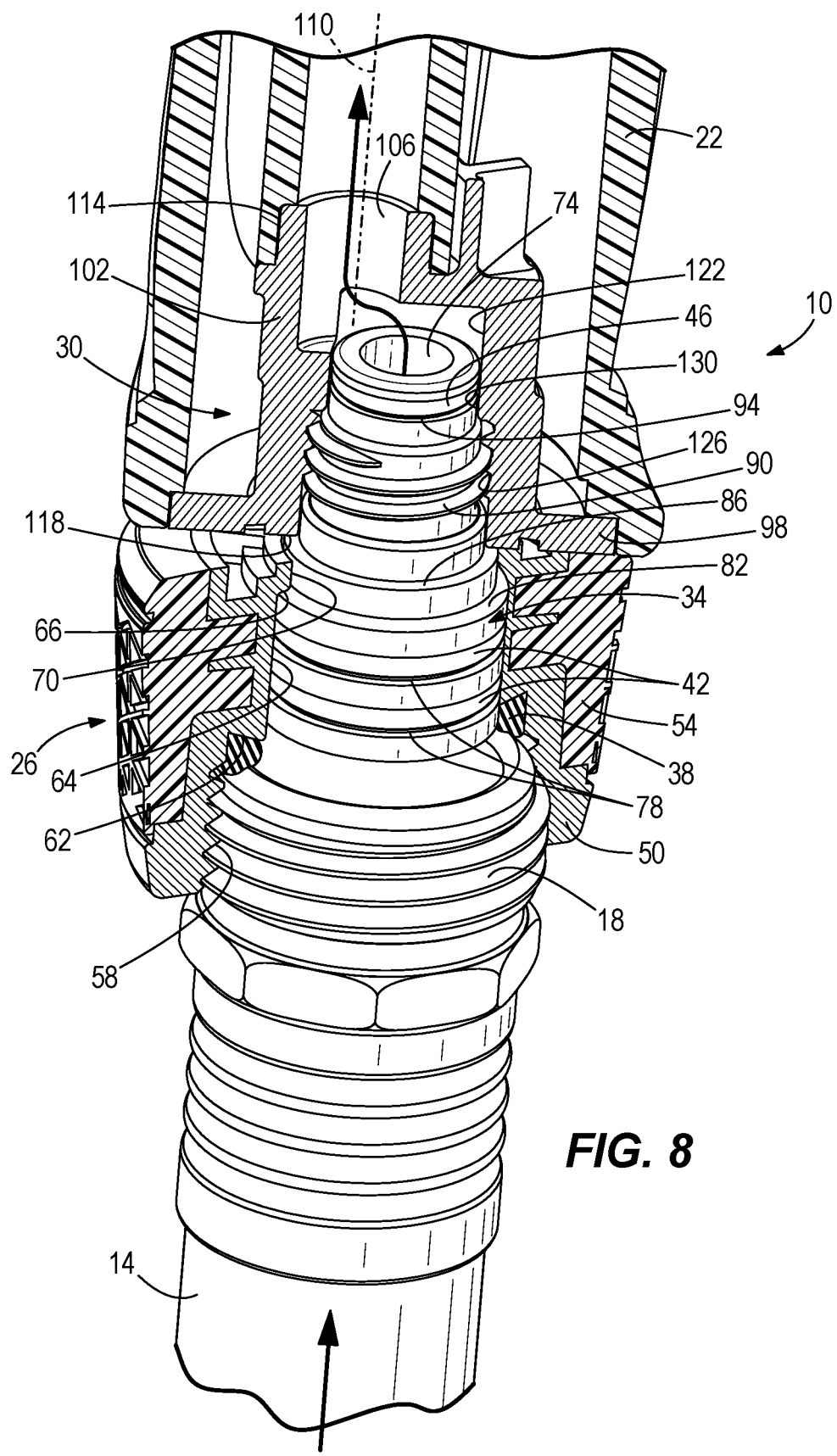
FIG. 8 is a partial section view of the assembled watering nozzle and garden hose taken along line 8-8 of FIG. 1.

As shown in FIG. 8, the watering nozzle 10 is assembled by installing the inlet o-ring 46 in the inlet recess 94 of the insert shank 34, the two swivel o-rings 42 in the swivel recesses 78 of the insert shank 34 and inserting the insert shank 34 through the opening 70 of the swivel coupling 26 until the first shank shoulder 82 contacts the swivel shoulder 66. When fully inserted, the swivel o-rings 42 provide a seal between the swivel seal surface 64 of the swivel coupling 26 and the swivel recesses 78 of the insert shank 34 while allowing rotation of the swivel coupling 26 about the central axis 56 relative to the insert shank 34.

The insert shank 34 is then inserted into the inlet cavity 122 of the inlet connector 30 and the shank threads 90 are threaded into the inlet threads 126 of the inlet connector 30 until the second shank shoulder 86 abuts the lower surface 118 of the flange 98. When fully threaded into place, the inlet o-ring 46 provides a seal between the inlet seal surface 130 of the inlet connector 30 and the inlet recess 94 of the insert shank 34.

When fully assembled, the insert shank 34 is rigidly mounted to the inlet connector 30 and does not rotate. The swivel coupling 26 is separated from the lower surface 118 of the inlet connector 30 by the spacing between the first shank shoulder 82 and the second shank shoulder 86. The spacing provides an offset or a gap between the lower surface 118 of the inlet connector's 30 flange 98 and the swivel coupling 26. The engagement of the first shank shoulder 82 and the swivel shoulder 66 inhibits axial movement of the swivel coupling 26 along the central axis 56. The swivel connector 26 can rotate about the central axis 56 while the swivel o-rings 42 maintain a water tight seal between the swivel coupling 26 and the insert shank 34.

In operation, the user inserts the garden hose thread connector 18 into the swivel coupling 26 and engages the swivel threads 58. The user then rotates the swivel coupling 26 to thread the garden hose thread connector 18 into the swivel threads 58 until the hose o-ring 38 is compressed into the hose seat 62 to provide a watertight seal between the swivel coupling 26 and the garden hose thread connector 18. The user then grasps the handle 22 and can freely rotate the handle 22 relative to the hose 14 during use. A fluid flow path (indicated by the arrow in FIG. 8) is provided from the hose 14, through the swivel coupling, through the opening 74 of the insert shank 34, through the inlet cavity 122 of the inlet connector 30, and out the inlet opening 106. The inlet opening 106 provide fluid to the handle 22. In some embodiments, the watering nozzle 10 includes a nozzle (not shown, that receives fluid flow from the handle 22 and provides a stream of fluid (e.g., water) that can be directed by the user.

While the detailed drawings and specific examples given describe various exemplary embodiments of the camping utensil kit, they serve the purpose of illustration only. It is to be understood that the invention is not limited in its application to the details of construction and the arrangements of components set forth in the preceding description or illustrated in the drawings. Furthermore, other substitutions, modifications, changes, and omissions may be made in the design, operating conditions, and arrangements of the exemplary embodiments without departing from the scope of the invention.

What is claimed is:

1. An attachment mechanism for a hose attachment, comprising:

a swivel coupling including a garden hose thread, a hose seal seat, a swivel seal surface, and a swivel shoulder adjacent a swivel opening arranged concentrically about a central axis; and an insert shank including a shank engagement feature including threads configured to threadingly engage the hose attachment a swivel recess retaining a swivel seal in sealed contact with the swivel seal surface, and a first shank shoulder in contact with the swivel shoulder when the shank engagement feature is inserted through an opening of the swivel coupling.

2. The attachment mechanism of claim 1, wherein the swivel seal surface defines a constant diameter along the central axis.

3. The attachment mechanism of claim 1, wherein the swivel coupling includes a rigid swivel body and a textured grip.

4. The attachment mechanism of claim 1, wherein the hose seal seat defines an acute angle configured to bias a garden hose seal away from the central axis under compression.

5. The attachment mechanism of claim 1, wherein the swivel coupling rotates relative to the insert shank.

6. The attachment mechanism of claim 1, wherein the shank engagement feature includes threads.

7. The attachment mechanism of claim 1, further comprising an inlet connector rigidly coupled to the hose attachment and including an inlet engagement feature structured to rigidly engage the shank engagement feature.

8. The attachment mechanism of claim 7, wherein the insert shank defines a second shank shoulder spaced from the first shank shoulder and arranged to abut the inlet connector.

9. A watering nozzle comprising:

a handle configured to be grasped by a user;

an inlet connector including a flange rigidly coupled to the handle, and an inlet engagement feature;

a swivel coupling including a garden hose thread and a swivel shoulder adjacent a swivel opening arranged concentrically about a central axis, the swivel coupling rotatable relative to the handle about the central axis; and an insert shank including a shank engagement feature in rigid engagement with the inlet engagement feature, a swivel seal in sealed contact with the swivel coupling, and a first shank shoulder in contact with the swivel shoulder when the shank engagement feature is inserted through an opening of the swivel coupling.

10. The watering nozzle of claim 9, wherein the insert shank defines a second shank shoulder spaced from the first shank shoulder and arranged to abut the flange of the inlet connector.

11. The watering nozzle of claim 9, wherein the shank engagement feature and the inlet engagement feature include threads.

12. The watering nozzle of claim 9, wherein a fluid flow path is provided through the swivel coupling, the insert shank, and the inlet connector.

13. The watering nozzle of claim 9, wherein the swivel seal includes an o-ring received within a swivel recess of the insert shank, and wherein the swivel coupling includes a swivel seal surface that defines a constant diameter arranged to sealingly engage the swivel seal while allowing rotation of the swivel coupling relative to the insert shank about the central axis.

14. The watering nozzle of claim 9, wherein the shank engagement feature includes a recess and an o-ring, and wherein the inlet engagement feature includes an inlet seal surface that defines a constant diameter arranged to sealingly engage the o-ring.

15. A method comprising:

rigidly coupling an inlet connector flange of an inlet connector to a handle of a hose attachment;

aligning a swivel opening of a swivel coupling with an inlet cavity of the inlet connector;

inserting a shank engagement feature of an insert shank through the swivel opening;

engaging a seal of the insert shank with a sealing surface of the swivel coupling; and engaging the shank engagement feature with an inlet engagement feature of the inlet connector so that a first shank shoulder of the insert shank abuts a swivel shoulder of the swivel coupling.

16. The method of claim 15, wherein engaging the shank engagement feature with the inlet engagement feature includes engaging shank threads with inlet threads.

17. The method of claim 15, wherein engaging the shank engagement feature with the inlet engagement feature includes engaging a second shank shoulder of the insert shank with a lower surface of the inlet connector flange.

18. The method of claim 15, further comprising engaging swivel threads of the swivel coupling with a garden hose thread connection.

* * * * *